(12) United States Patent  (10) Patent No.: US 9,325,968 B2
Baldwin  (45) Date of Patent: *Apr. 26, 2016

(54) STEREO IMAGING USING DISPARATE IMAGING DEVICES

(71) Applicant: Amazon Technologies, Inc., Reno, NV (US)

(72) Inventor: Leo B. Baldwin, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/599,307

(22) Filed: Jan. 16, 2015

(65) Prior Publication Data

US 2015/0181197 A1  Jun. 25, 2015

Related U.S. Application Data

(63) Continuation of application No. 13/253,854, filed on Oct. 5, 2011, now Pat. No. 8,937,646.

(51) Int. Cl.
*H04N 13/02* (2006.01)
*H04N 13/00* (2006.01)
*G06T 5/50* (2006.01)
*H04N 5/262* (2006.01)
(Continued)

(52) U.S. Cl.
CPC .............. *H04N 13/0239* (2013.01); *G06T 5/50* (2013.01); *H04N 5/262* (2013.01); *H04N 13/00* (2013.01); *H04N 13/0011* (2013.01); *H04N 13/0055* (2013.01); *H04N 13/0242* (2013.01); *H04N 13/0296* (2013.01); *G02B 23/2415* (2013.01); *G06T 7/0022* (2013.01); *G06T 2207/10024* (2013.01); *G06T 2207/10028* (2013.01); *H04N 2013/0081* (2013.01)

(58) Field of Classification Search
CPC .............. H04N 13/0239; H04N 5/262; H04N 13/0296; H04N 13/005; H04N 2013/0081; G06T 7/0022
USPC ........................................................... 348/47
See application file for complete search history.

(56) References Cited

U.S. PATENT DOCUMENTS 5,258,833 A  11/1993 Schenk
6,501,468 B1 * 12/2002 Kaji ............................... 345/419
6,549,650 B1 * 4/2003 Ishikawa et al. .............. 382/154

(Continued)

FOREIGN PATENT DOCUMENTS

EP  2509065 A1  10/2012

OTHER PUBLICATIONS

Grieve et al, In vivo anterior segment imaging in the rat eye with high speed white light full-filed optical coherence tomography, Aug. 2005.

*Primary Examiner* — Shan Elahi
(74) *Attorney, Agent, or Firm* — Polsinelli

(57) ABSTRACT

Stereo imaging can be provided on an electronic device without the need for two matched, high resolution, large format cameras. In various embodiments, two or more cameras of disparate types can be used to capture stereoscopic images. Various processing algorithms can be used to adjust aspects such as the effective pixel size and depth of focus in order to provide for sufficient information to generate three-dimensional images without significant artifacts resulting from differences in the mismatched cameras.

20 Claims, 7 Drawing Sheets

(51) Int. Cl.
  *G06T 7/00* (2006.01)
  *G02B 23/24* (2006.01)

(56) References Cited

U.S. PATENT DOCUMENTS

| | | | |
|---|---|---|---|
| 6,631,205 B1* | 10/2003 | Melen et al. | 382/154 |
| 6,847,336 B1* | 1/2005 | Lemelson et al. | 345/8 |
| 6,919,892 B1* | 7/2005 | Cheiky et al. | 345/473 |
| 7,486,817 B2* | 2/2009 | Yanagawa et al. | 382/154 |
| 2003/0161010 A1 | 8/2003 | Schinner | |
| 2003/0229735 A1 | 12/2003 | Sorokin et al. | |
| 2004/0208358 A1* | 10/2004 | Tooyama et al. | 382/154 |
| 2005/0195478 A1* | 9/2005 | Yanagawa et al. | 359/462 |
| 2006/0034003 A1 | 2/2006 | Zalevsky | |
| 2006/0034485 A1 | 2/2006 | Negahdaripour | |
| 2006/0244826 A1 | 11/2006 | Chew | |
| 2006/0250503 A1 | 11/2006 | Crutchfield et al. | |
| 2006/0263758 A1 | 11/2006 | Crutchfield et al. | |
| 2007/0001095 A1 | 1/2007 | Angell et al. | |
| 2007/0031064 A1 | 2/2007 | Zhao et al. | |
| 2007/0046776 A1* | 3/2007 | Yamaguchi et al. | 348/53 |
| 2007/0120977 A1 | 5/2007 | Duquette et al. | |
| 2007/0200914 A1 | 8/2007 | DuMas et al. | |
| 2007/0236514 A1* | 10/2007 | Agusanto et al. | 345/646 |
| 2007/0279415 A1* | 12/2007 | Sullivan et al. | 345/427 |
| 2008/0198482 A1 | 8/2008 | Zalevsky | |
| 2009/0002483 A1* | 1/2009 | Yanagawa et al. | 348/46 |
| 2009/0055205 A1 | 2/2009 | Nguyen et al. | |
| 2009/0231414 A1 | 9/2009 | Graham et al. | |
| 2010/0007665 A1* | 1/2010 | Smith et al. | 345/473 |
| 2010/0039698 A1 | 2/2010 | Robinson et al. | |
| 2010/0097444 A1* | 4/2010 | Lablans | 348/46 |
| 2010/0277571 A1 | 11/2010 | Xu et al. | |
| 2010/0305455 A1 | 12/2010 | Frangioni | |
| 2010/0328517 A1 | 12/2010 | Mathieu | |
| 2011/0025825 A1* | 2/2011 | McNamer et al. | 348/46 |
| 2011/0025829 A1* | 2/2011 | McNamer et al. | 348/50 |
| 2011/0043615 A1 | 2/2011 | Saishu et al. | |
| 2011/0063419 A1* | 3/2011 | Lee et al. | 348/47 |
| 2011/0082541 A1 | 4/2011 | Zalevsky | |
| 2011/0090323 A1* | 4/2011 | Shibata | 348/54 |
| 2011/0098083 A1* | 4/2011 | Lablans | 455/556.1 |
| 2011/0115965 A1 | 5/2011 | Engelhardt et al. | |
| 2011/0243542 A1* | 10/2011 | Pace et al. | 396/325 |
| 2011/0244958 A1* | 10/2011 | Nimura et al. | 463/31 |
| 2011/0261247 A1 | 10/2011 | Mathieu | |
| 2012/0002084 A1 | 1/2012 | Weissman et al. | |
| 2012/0007940 A1 | 1/2012 | Michrowski et al. | |
| 2012/0028678 A1* | 2/2012 | Lim et al. | 455/556.1 |
| 2012/0105574 A1* | 5/2012 | Baker et al. | 348/36 |
| 2012/0133790 A1 | 5/2012 | Sams | |
| 2012/0176477 A1* | 7/2012 | Givon | 348/46 |
| 2012/0176481 A1* | 7/2012 | Lukk et al. | 348/47 |
| 2012/0188347 A1 | 7/2012 | Mitchell | |
| 2012/0200495 A1* | 8/2012 | Johansson | 345/156 |
| 2012/0200565 A1* | 8/2012 | Tsukagoshi | 345/419 |
| 2012/0229673 A1 | 9/2012 | Solomon | |
| 2012/0257018 A1* | 10/2012 | Shigemura et al. | 348/46 |
| 2012/0314296 A1 | 12/2012 | Shabtay et al. | |
| 2012/0327174 A1 | 12/2012 | Hines et al. | |
| 2013/0113793 A1* | 5/2013 | Uchida | 345/419 |

* cited by examiner

STEREO IMAGING USING DISPARATE IMAGING DEVICES

CROSS-REFERENCES TO RELATED APPLICATIONS

This application is a continuation of U.S. patent application Ser. No. 13/253,854, filed on Oct. 5, 2011 and titled "STEREO IMAGING USING DISPARATE IMAGING DEVICES", of which the full disclosure of this application is incorporated herein by reference for all purposes.

BACKGROUND

People are increasingly interacting with computers and other electronic devices in new and interesting ways. For example, mobile devices are increasingly offering multiple high quality cameras that enable additional types of functionality. In some devices, two of these high quality cameras can be used to provide three-dimensional (3D) image capture, for both still and video imaging. A downside to conventional 3D image capture, however, is the fact that stereo cameras in mobile electronic devices typically are relatively large with respect to these devices, particularly when these cameras include auto-focusing mechanisms. A device such as a smart phone can have difficulty fitting two 1.0 cubic centimeter high resolution cameras within the desired form factor of the device. Further, such cameras can be relatively expensive and resource intensive to operate. These and other limitations can prevent certain small mobile devices from offering 3D imaging within various constraints (e.g., size and pricing) placed on those devices.

BRIEF DESCRIPTION OF THE DRAWINGS

Various embodiments in accordance with the present disclosure will be described with reference to the drawings, in which.

DETAILED DESCRIPTION

Figure 1:
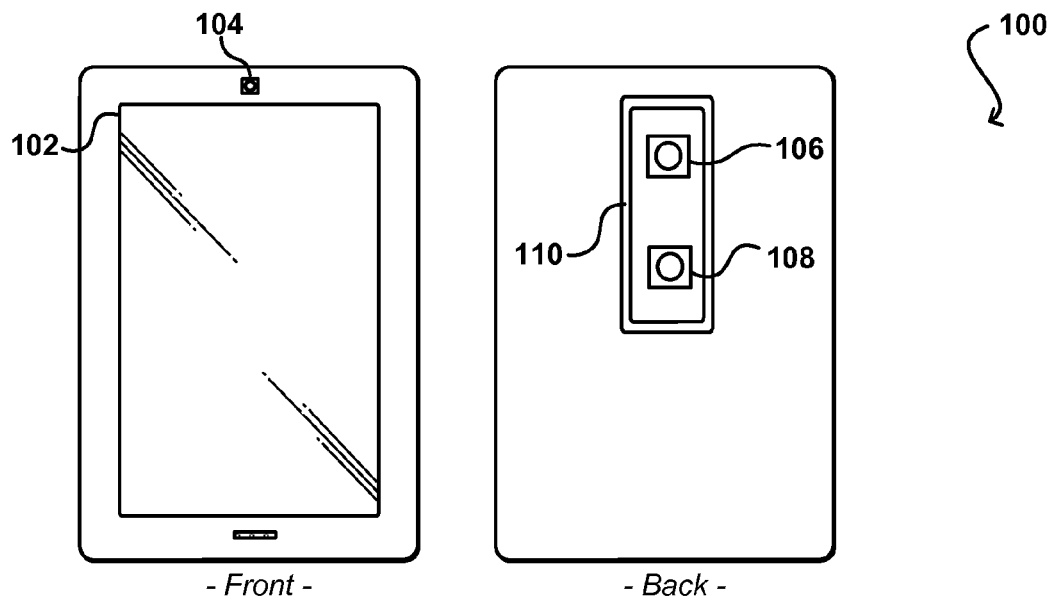
FIG. 1 illustrates front and back views of an example computing device including a conventional pair of cameras for 3D imaging of the prior art.

Systems and methods in accordance with various embodiments of the present disclosure may overcome one or more of the aforementioned and other deficiencies experienced in conventional approaches to capturing image information using an electronic device. In particular, various embodiments enable the capture of three-dimensional (3D) or stereoscopic image data without requiring a pair of high resolution, auto-focusing cameras that can be relatively large and/or expensive, particularly for small mobile devices. Further, such approaches can operate at lower power and with lower memory and/or processing requirements.

In one embodiment, two different types of camera can be used to provide for stereo imaging. The first camera can be a relatively large, high resolution camera with a first aperture, with the second camera being a smaller camera having a lower resolution and a different aperture size. In at least some embodiments, the resolution and/or effective pixel size of the larger camera can be adjusted in order to better match the information in the lower resolution image. In order to compensate for different depths of focus for each camera, an appropriate aperture can be determined in order to have a similar depth of focus for each camera. Aperture sizes can be calculated that typically result in a larger aperture on the smaller camera than for conventional cameras of that size and/or resolution, as well as a potentially smaller aperture for the larger camera than for conventional cameras of that type on other electronic devices. By balancing the depths of focus, the image information can be combined in a way that will not generate significant false contours in the resulting 3D image information.

In another embodiment, an enhanced depth of focus technique is used to address differences in depth of focus without requiring an expensive auto-focusing camera. In at least some embodiments, a custom lens can be utilized for at least one of the cameras of different types in order to focus different wavelengths (e.g., red (R), green (G), and blue (B)) in different locations. By analyzing captured image information for different wavelengths or wavelength ranges (e.g., each of the RGB components) for various portions of the image, the wavelength that is most in focus for each of those portions can be selected to provide the detail, and the other wavelengths then can be added in to provide appropriate color data. Such an approach enables auto-focusing to be done algorithmically, instead of mechanically using a motorized focusing mechanism.

In yet another embodiment, three (or more) cameras can be used to provide stereo imaging. In this embodiment, a pair of relatively low resolution cameras can be used to capture the three-dimensional position and/or disparity mapping data. A third, higher resolution camera can be used to capture higher resolution or more detailed image information. The image information captured by the lower resolution cameras (that can be implicitly matched) can be used to provide the disparity mapping data for 3D (i.e., generate a z-map), with the image data from the higher resolution camera being used to overlay color and intensity data. Such an approach effectively enables a low-resolution 3D map to be generated, which then can be painted using the image information from the higher resolution camera.

Various other applications, processes, and uses are presented below with respect to the various embodiments.

As mentioned above, conventional electronic devices offer stereoscopic or 3D imaging using a pair of high resolution matched cameras. For example, FIG. 1 illustrates front and back views of an example electronic device 100 of the prior art wherein a front of the device includes a display screen 102 and other input elements, such as a front-facing camera 104 for video chat or other such purposes. The display can be, for example, a glasses-free 3D capable display, a display capable of presenting glasses-assisted 3D image information, or a conventional 2D display. The device also includes a pair of matched cameras 106, 108 on the back side of the device. These cameras are separated a distance sufficient to enable stereoscopic imaging and typically are relatively high resolution cameras (e.g., 5.0 MP or above for conventional devices). As mentioned, these high resolution cameras also typically come with auto-focusing mechanisms, which can further increase the form factor or footprint of the camera assembly. In some embodiments, the cameras can be on the order of about 1.0 cubic centimeters in volume, and are mounted to a circuit board at the determined separation. The overall size of the stereo imaging assembly can be large enough that at least a portion 110 of the assembly extends out beyond the plane of the back of the device in a protruding portion in certain devices. As discussed, the size of such an assembly can be undesirable for at least certain designs of devices. Further, the high resolution cameras produce large images that can be processor and/or memory intensive. In many cases, the user will view 3D images and/or video on the computing device or on a television or monitor with 3D capability, and not print out the images as with conventional two-dimensional still images, such that there might be little to no advantage to having high resolution 3D image capture (such as resolutions over 2.0 MP for current devices). Further, the power required to operate these devices can potentially be more than desired for portable or small mobile devices.

Figure 2:
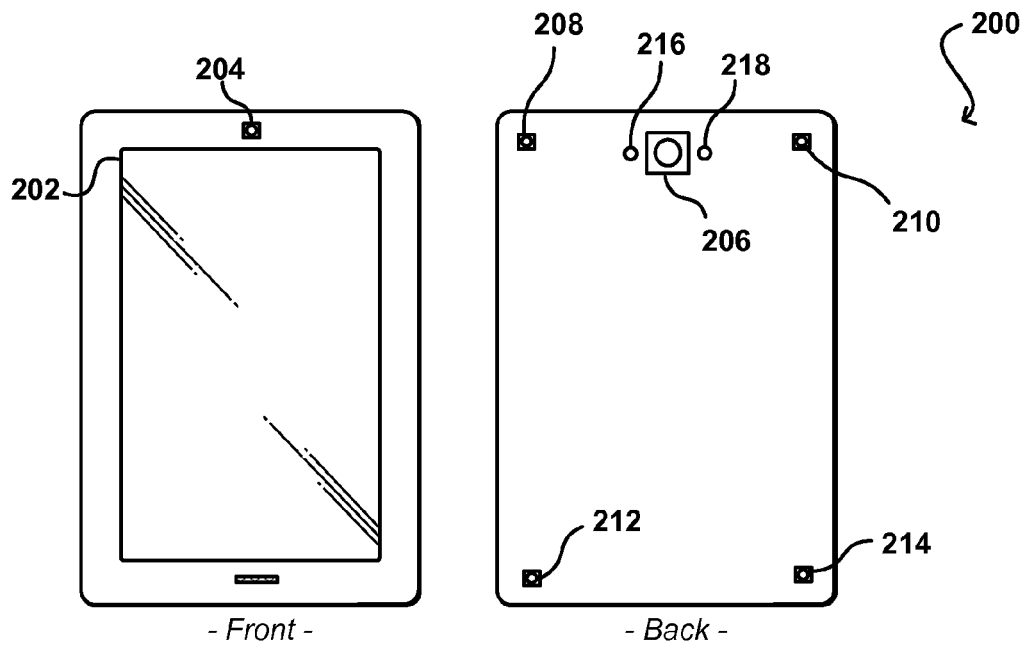
FIG. 2 illustrates front and back views of an example computing device including a multiple cameras capable of providing 3D imaging in accordance with various embodiments.

Accordingly, systems and methods in accordance with various embodiments provide for stereoscopic or 3D image capture without the need for two high resolution and/or large format cameras. FIG. 2 illustrates front and back views of one such electronic device 200 that can be used in accordance with various embodiments. Although a portable computing device (e.g., a smart phone, an e-book reader, or tablet computer) is shown, it should be understood that various other types of electronic devices that are capable of determining and processing input can be used in accordance with various embodiments discussed herein. These devices can include, for example, notebook computers, personal data assistants, cellular phones, video gaming consoles or controllers, and portable media players, among others. The electronic device can utilize some of the same elements as a conventional device, such as may include a display screen 202 and a front-facing camera 204. The example device illustrated also includes a high-resolution camera 206 that can include auto-focusing elements for use in still image capture or two-dimensional video capture. The example device can include other elements useful for imaging as well, such as a light sensor 216 for determining an amount of ambient light and a white light LED 218, or other such illumination element, useful in illuminating objects within at least a portion of a field of view of the camera 206. Each image capture element may be, for example, a camera, a complimentary metal-oxide semiconductor (CMOS) device, a motion detection sensor, or an infrared sensor, or can utilize another appropriate image capturing technology. It should be understood that while certain elements are shown to be included on a "front" or "back" side of the device that any or all of these elements can be positioned on various sides, edges, faces, or other regions of such a device. Further, terms such as "front," "back," and "top" are used for purposes of explanation and are not intended to be interpreted as required orientations unless otherwise stated.

In addition, the example electronic device 200 can include at least one secondary camera for use with the high-resolution camera to provide for stereoscopic imaging. As discussed elsewhere herein, the device can include a single secondary camera 208 or pair of secondary cameras 208, 210 to work with the high resolution camera 206 to provide stereoscopic imaging. In at least some embodiments, there can be additional cameras 212, 214 as well as may be used with stereo- or multi-viewpoint imaging, or can be used for other purposes such as gesture recognition or motion control. In at least some embodiments, the secondary cameras do not have focusing elements, and have a smaller device footprint and lower resolution (e.g., 2.0 MP or less) than the high resolution camera 206. The locations, types, and combinations of these secondary cameras can vary between embodiments as should be apparent in light of the present disclosure. Also, similar or alternative secondary cameras can be used on the front of the device with the front-facing camera as well in at least some embodiments.

For any pair of these cameras that have at least a partially overlapping field of view, stereoscopic imaging can be performed by capturing image information for one or more objects from two different perspectives or points of view, and combining the information to produce a 3D image. In at least some embodiments, the fields of view can be matched through careful placement and calibration, as well as by manipulating the focal lengths for each camera as discussed elsewhere herein. Methods for producing a 3D image using image information from different perspectives are well known in the art and will not be described in detail herein. Example approaches include calculating an amount of disparity through a process such as edge matching, color matching, and/or texture matching, and combining the disparity information with color information from each perspective to generate a stereoscopic image, either before or at a time of display. For example, if the image information is matched then the image information can be combined and/or displayed directly on a 3D-capable display, wherein the human brain can effectively do at least some of the 3D processing. In other examples, the image information can be otherwise combined or processed at the time of display such that upon displaying the information a 3D image is generated. Using a device with disparate camera types such as those illustrated in FIG. 2, however, can present challenges in producing a high quality 3D image. For example, a high resolution camera and smaller, less expensive, low resolution camera can have multiple aspects that are mismatched, in addition to the size and resolution. These can include, for example, the field of view, the aperture, and the depth of focus, as well as various aberrations, distortions, or other variations.

The difference in resolution can be handled in a relatively straightforward manner, as the resolution of the lower resolution camera can be used for both cameras, with a depth map being generated using the lower resolution and color and intensity values being mapped from the larger resolution camera. For any edge positions visible only from the lower resolution camera (i.e., due to differences in perspective between the cameras), one or more image processing algorithms can be used to smooth out or otherwise improve the quality of the image at those locations. In at least some embodiments, the higher resolution camera can be operated in a lower resolution mode, using approaches known for various conventional cameras. If the low resolution camera also has smaller pixels, various other adjustments might need to be accounted for in software and/or hardware, including adjustments to the sensitivity and/or dynamic range of at least one of the cameras or images produced by at least one of the cameras.

Various optical properties of the two cameras can also be made to be relatively similar. For example, the fields of view can be matched within the production tolerance of the lenses and the amount of light transmitted can be matched as well. In certain embodiments the amount of light transmitted by the camera lenses is not matched, but rather the sensitivity of the camera systems. In such a situation, the transmission of the lens combined with the sensitivity of the imager can be matched.

A potentially more difficult problem, however, results from the fact that lenses of different sizes or shapes can have significantly different depths of focus. For inexpensive cameras with relatively small lenses, the depth of focus can be quite large such that a focusing element is not necessary for many different situations. For larger imaging format cameras (i.e., larger physical dimensions with higher resolution), however, the lens element(s) might have a very small depth of focus, such that the camera needs to be focused quite accurately on the object of interest, and objects that are even a slight bit closer or further away from the camera can quickly be out of focus. When using a smaller format and a larger format camera for stereoscopic imaging, a problem can arise in that the different depths of focus can result in objects (particularly background objects) that are in focus in the image from one perspective but out of focus in the image from the other perspective. This difference can result in different amounts of blur between the images, which can result in false disparity in the z-map or contours of the resulting 3D image.

Figure 3:
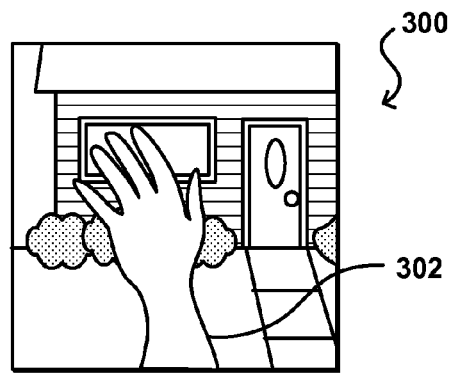
FIGS. 3(a), (b), and (c) illustrate a examples of images that can be used and/or generated using disparate types of cameras without correction.
Figure 3:
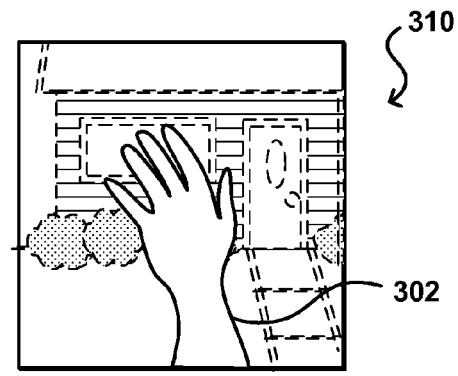
Figure 3:
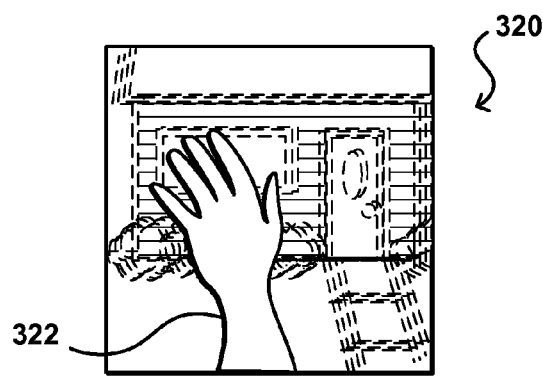

For example, FIG. 3(a) illustrates a first image 300 captured using a smaller format camera of an electronic device. In this example, the camera is capturing an image of a hand 302, as may be part of a video capture or used for purposes such as motion detection or gesture input. Due at least in part to the large depth of focus of the smaller camera, the objects in the background are relatively clear and/or in focus. FIG. 3(b) illustrates a second image 310 captured using a larger format camera with a shorter depth of focus. As can be seen, the hand 302 is still in focus in the second image 310 but the objects in the background are blurry. When these two images are combined to generate a three-dimensional image, as represented by the third image 320 of FIG. 3(c), the hand 322 might be represented adequately based on the clarity of the hand information in the first and second images, but the background portion of the image can have a number of false contours or might otherwise not represent a true 3D view of the background objects as the differences in blur or other such artifacts between the images can negatively impact the disparity or otherwise create noise that can degrade the overall 3D effect of the combined image.

One of the factors leading to the differences in depth of focus is the way in which apertures scale for cameras and/or lenses of different sizes. Apertures are typically measured in f-stops, which generally refer to relative fractions of the focal length of the lens. A smaller number f-stop, such as f/2.0, refers to a wider aperture, while a larger number f-stop, such as f/22, refers to a smaller aperture. A small camera having an aperture of f/11 or higher will generally produce images in which almost all the objects in the image are in focus, while a larger camera with an aperture of, for example, f/2.8 might have such a short depth of focus that the eyes of a person in an image might be in focus but the hair further back on the sides of that person's head might be out of focus. Apertures work differently with different size lenses and cameras, however, so it is not as simple as utilizing the same aperture for both cameras.

An approach in accordance with various embodiments addresses at least these differences by attempting to match the depth of focus for each of the stereo imaging cameras through setting of the apertures for the cameras. In at least one embodiment, a determination is made as to a preferred depth of focus for the cameras, as may be based on desired imaging capabilities, anticipated use (e.g., close-up portraits or outdoor use), and/or other such factors. In at least some embodiments, selecting a desired depth of focus results in a larger aperture being used with the smaller camera than might otherwise be used and/or a smaller aperture on the larger camera. In one example, a smaller camera has an f/2.0 aperture and a larger camera has an f/2.8 or f/3.2 aperture, depending upon factors such as the dimensions of the respective cameras.

In a more detailed example, the format of the larger camera is 1.6 times larger than the small camera. Even in a case where the format difference is mitigated by an effective pixel that is 1.6 times larger, the focal ratio of the larger camera is calculated to advantageously utilize around three times the focal ratio of the smaller camera (e.g., f/1.4 with respect to f/4.2). Such differences are calculated based on an object distance of 100 mm and matching depths of field.

In particular, the larger camera module in this example has an 8 MP resolution in a 1/3.2" format (dimensions of 4.57 mm×3.427 mm, 5.712 mm diagonal, and a resolution of 3264×2448), including 1.4 μm pixels with a lens that provides a 60° field of view (diagonal). For a 60° field of view for this camera module, the required focal length is on the order of around 5 mm. The lens for the camera operates at an aperture of f/2.4. To calculate the depth of field (the range of acceptable focus in object space) for a distance of 10 cm, for example, the depth of focus (the range of acceptable focus in image space) is first calculated at a finite object distance, as depth of focus is infinite at infinity. In at least one example, the depth of focus can be given by:

$$t=2Ncv/f$$

where N is the focal ratio, c is the circle of confusion, v is the object distance, and f is the focal length. The circle of confusion in this example can be taken as pixel pitch (e.g., distance from edge to edge or center to center of adjacent pixels), although other approximations can be used in other embodiments. While the number will change for different values, the overall ratios will not change. Using values N=2.4, c=1.4, v=100×10$^3$, and f=5×10$^3$ (all in microns), the depth of focus is 134 microns. This must be projected into the field, which is in object space. To do that, the linear magnification is calculated, which is equal to the lateral magnification squared. Lateral magnification is the ratio of the size in object space to the size in image space, given by:

$$M=f/(f-d)$$

where f is the focal length and d is the object distance. In this case, f=5, d=100, and m=−0.0526x, where the negative indicates that the image is inverted. As a result, the lateral magnification m$^2$=0.00277, with the resulting depth of field being 48.5 mm.

A similar determination then can be made for the smaller format camera module. In this example, a 2 MP companion camera has a 1/5" format (dimensions of 2.842 mm×2.121 mm, 3.546 mm diagonal, and a resolution of 1600×1200) with 1.75 μm pixels and a lens that yields a 60° field of view (diagonal). For a 60° FOV, a desired focal length can be calculated to be on the order of about 3 mm. If the lens operates at an aperture of f/2.4, using the above formula for depth of focus and values of N=2.4, c=1.75, v=100×10$^3$, and f=3×10$^3$ (all in microns), then the depth of focus is 280 microns. The lateral magnification then is given by 0.000957, such that the depth of field is 293 mm or about six times the depth of field of the other camera.

For stereo imaging, the larger image can be sub-sampled or otherwise processed down to the same resolution as the smaller camera. The sub-sampling can change the effective pixel size of the camera from 1.4 μm to 2.8 μm. Scaling from 8 MP to 2 MP requires binning pixels in 2×2 blocks or skipping every other pixel, effectively doubling the pixel pitch in each dimension. Using $N=2.4$, $c=2.8$, $v=100\times10^3$, and $f=5\times10^3$ (all in microns), the depth of focus is 269 μm and the depth of field is 97 mm, which is still on the order of about three times less than that of the smaller camera. This has implications for using these two cameras as a stereo pair, as objects that are out of focus in the image from the 8 MP camera, even after scaling to 2 MP, will be in focus in the 2 MP camera. This difference can give rise to spurious disparities in the stereo disparity image. A solution to this problem is to scale the focal ratio of the cameras. Factors to be considered include the ratio of the formats and the ratio of the pixel sizes. The depth of focus is proportional to each of these factors. The triple amount of disparity is too great to overcome by changing one camera in this example.

The small camera at f/1.4 gives a depth of field of 170.8 mm at 100 mm. Scaling the aperture of the larger camera module to account for both the larger imager and the larger effective pixel pitch by a factor of three times gives a focal ratio of f/4.2 and a depth of field of 169.9 mm at 100 mm, which is sufficiently close to the 170.8 mm depth of field of the smaller camera. Using the more usual f/4.0 for the large camera could give a depth of field of about 162 mm at 100 mm, which might be sufficient for at least some applications.

Figure 4:
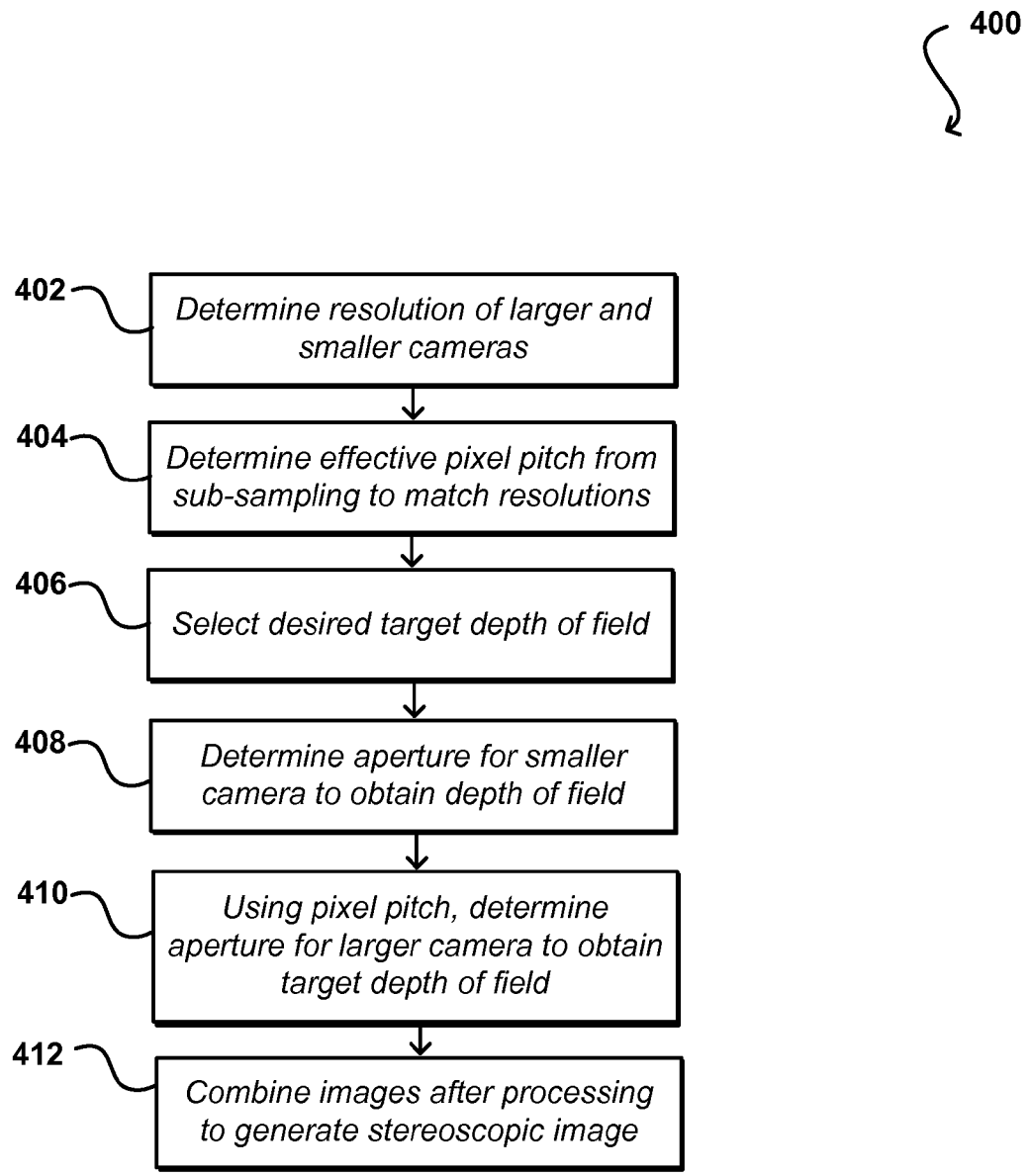
FIG. 4 illustrates a first example process for providing 3D imaging that can be analyzed in accordance with various embodiments.

FIG. 4 illustrates an example process 400 for matching depth of field for two disparate camera types that can be used in accordance with various embodiments. It should be understood that, for any process discussed herein, there can be additional, fewer, or alternative steps performed in similar or alternative orders, or in parallel, within the scope of the various embodiments unless otherwise stated. In this example, where there is a larger format camera and a smaller format camera, the resolutions of the cameras are determined 402, and an effective pixel pitch for the larger camera is determined 404 based on the amount of sub-sampling or binning needed to adjust images captured with the larger format camera to the determined resolution of the smaller format camera. Based on a number of factors discussed herein, such as the desired application or other factors, a target depth of field can be selected 406. An aperture size can be calculated 408 for the smaller format camera that will result in approximately the target depth of field. Using the effective pixel pitch and any other pertinent information, an aperture size can also be calculated 410 for the larger format camera that can result in approximately the target depth of field. As long as the resulting depths of fields are matched within an allowable deviation for the target application, or other such factor, the controlled ratio of apertures can be used to enable stereo imaging via the disparate cameras. After this and any other processing of the individual images, or as part of the same processing a stereoscopic image can be generated 412 using the processed image information. As discussed elsewhere herein, this can include generating a stereoscopic image file by combining the images captured by the two cameras and storing that image file for subsequent display, or displaying the images captured by the two cameras together using a stereoscopic or 3D image display element to generate the stereoscopic image at the time of display. In at least some embodiments, the separate images including information for each perspective can be stored separately and then combined at a later time when the information is to be displayed using a stereoscopic image display element or other such mechanism.

An approach in accordance with other embodiments instead builds upon an enhanced depth of focus (EDOF) technique. In EDOF, a custom lens can be designed for a fixed focus camera that focuses different components of light in different ways. For example, different wavelengths (e.g., red (R), green (G), and blue (B)) might be focused at different distances (e.g., planes of focus) such that image information captured for each of the wavelengths (e.g., each of the RGB components) can be captured concurrently but analyzed separately. Effectively, three versions of the image can be analyzed, and intensity information for each portion taken from the image where that portion is the sharpest or most in focus, for example. In at least some embodiments, each color component will correspond to a plane of focus positioned based on factors such as the wavelength of the color component and the type of focusing lens. For each of a plurality of regions in an image, the region can be analyzed to determine which of the set of planes of focus (or color component images) is sharpest, or most in focus, for that region. That plane can be referred to as the "primary" plane of focus for that region. The intensity or luminance (e.g., black and white) information for a given region can then be taken from the primary plane of focus, and the color information from the other color components or planes used to "paint" that information to generate a full color image. Such an approach is advantageous at least for the fact that each region can take the sharpness of the color component that is most in focus for that region. Further, the regions can be of any appropriate size based upon factors such as desired sharpness, processing capability, available memory, and other such factors. In some embodiments, the colors are examined using 9 (3×3) or 16 (4×4) groupings of pixel information, although other selections can be used as well within the scope of the various embodiments. Such an approach enables auto-focusing to be done algorithmically, instead of mechanically using a motorized focusing mechanism. An advantage of such a process is that the adjustment can be done in software, and does not require the large or expensive hardware required in many devices for auto-focusing.

Although an EDOF-based approach can be applied to either camera, or both, in at least some embodiments the approach is applied to the larger format camera that generally will have less depth of field. With a smaller depth of field, as discussed, objects that are not in focus would likely appear blurrier in the larger camera images than the smaller camera images, which would be noticeable even after decimating or sub-sampling the image information to match. Accordingly, one or more algorithms can analyze the larger image by wavelength to select the information from the various wavelengths that is sharpest for various out-of-focus regions of the image. An overall focus level of the larger image thus can be improved, which can assist when combining with the image information from the smaller format camera. In some cases the EDOF adjustment can be made before decimating the image, in order to take advantage of the fact that some of the spurious data will be filtered out through the decimation process.

A potential problem with EDOF-based approaches is that the approaches can generate artifacts when objects are very out of focus. In some embodiments, one or more algorithms can identify regions as being "distant," "at infinity," or otherwise beyond EDOF correction, such that EDOF is not performed for those areas. In stereoscopic imaging very little 3D effect is obtained for objects far off in the distance, so various approaches can avoid attempting to generate 3D information for these areas at all and instead use the image information from the smaller camera to minimize the presence of artifacts in the resulting combined image.

Various lenses and optical elements can be designed to work with these approaches, as known in the art for EDOF and similar techniques, and the dimensions of these elements can also depend at least in part upon the intended use and/or likely depth of field needed. Certain embodiments can utilize chromatic aberration to assist with the adjustments, whereby knowledge of how light of different wavelengths focuses under different conditions can be used to help select colors or wavelengths that tend to be more in focus for current conditions. The appropriate color image can be selected in that case, with the color being added using various color interpolations.

Figure 5:
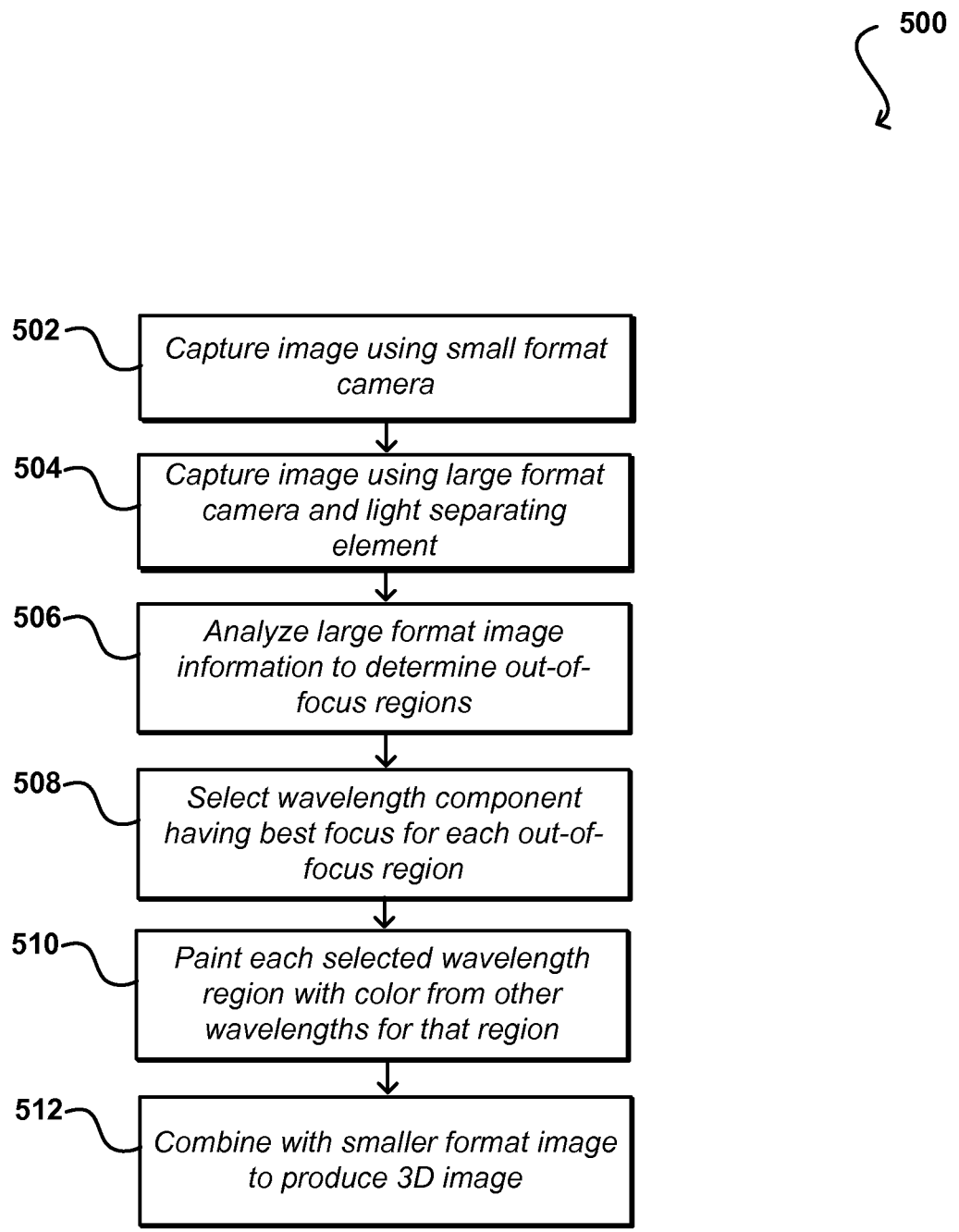
FIG. 5 illustrates a second example process for providing 3D imaging that can be analyzed in accordance with various embodiments.

FIG. 5 illustrates an example process 500 for improving depth of field for disparate camera types that can be used in accordance with various embodiments. In this example, stereo imaging information is captured by capturing 502 a first image using a small format camera and capturing 504 a second image using a larger format camera having at least one optical element (e.g., lens) for focusing two or more wavelengths or wavelength ranges of light to different focus locations. The large format image information can be analyzed to determine 506 one or more out-of-focus regions in the captured image information, such as where the region does not have edge or texture information at a high spatial frequency. As known, the spatial frequency of the edge or texture information can be indicative of a sharpness or level of focus, except in cases such as a plain wall or blue sky that has little edge or texture information, etc. The fractal dimension for each region can be measured in at least some embodiments to determine an amount of detail present in that region. For at least the regions with a low spatial frequency for the edge or texture information, for example, intensity and/or luminance information can be selected 508 for the wavelength or wavelength range (e.g., color component) having the best focus or sharpness, or that has the highest spatial frequency. Each region then can have color information from each of the color components applied to the intensity or luminance information (e.g., be "painted" 510 by determining color values for each pixel in the resulting image using the color information for each color component at that pixel value) from the selected color component to generate a properly colored image. The adjustments to the image from the larger camera can be performed before or after any binning or sub-sampling. The adjusted image from the larger camera can be combined 512 with the image information from the smaller format camera to produce a 3D image, using approaches such as those discussed elsewhere herein. Also as discussed elsewhere herein, the 3D image can be a file generated before a time of display or a stereoscopic image generated at display time by combining the two separate images, etc There are many approaches known and/or used for combining stereo images as mentioned previously, such that the merging or combining will not be discussed herein in detail. Generally, displacements for similar features are determined between the two images to be merged and a depth is assigned based at least in part upon the lateral difference in location in the image information (as closer objects with have a greater lateral displacement in the captured image information). Several different approaches can assist with the depth mapping, including color mapping, grayscale mapping, texture mapping, and edge mapping, among others. In some embodiments, a high resolution image captured by the larger format camera can be stored along with the lower resolution 3D information, as a user viewing the 3D information on an electronic device might be able to utilize a lower resolution version, but a user printing out that image might prefer the higher resolution version.

An approach in accordance with another embodiment takes advantage of three cameras, including a single high resolution or larger format camera, and a pair of smaller, matched, lower resolution cameras. As discussed with respect to FIG. 2, an electronic device might have two or more lower resolution cameras or sensors used for gesture detection or other such purposes. Approaches in accordance with various embodiments can use any pair of these matched cameras to obtain 3D information, as long as the cameras have a sufficiently overlapping field of view. In at least one embodiment, a larger format camera concurrently captures high resolution image information while the smaller cameras capture stereoscopic image information. The two images from the lower, matched cameras can be used to generate the depth map for 3D image information. Once the map is generated, the color information from the larger format camera image can be used to overlay the depth map with color from the larger format camera.

Such an approach has a benefit in that two relatively small and inexpensive cameras can be used that are implicitly matched, so there is no significant amount of processing to attempt to make the large format image appear more like the smaller format image. In some embodiments, the small cameras can be running in a master/slave mode, which can be relatively simple to operate. The higher resolution image is analyzed to coordinate the high color data with the low resolution disparity map such that the proper areas are painted. Edge regions without high resolution color data can be processed or smoothed algorithmically as discussed elsewhere herein.

Figure 6:
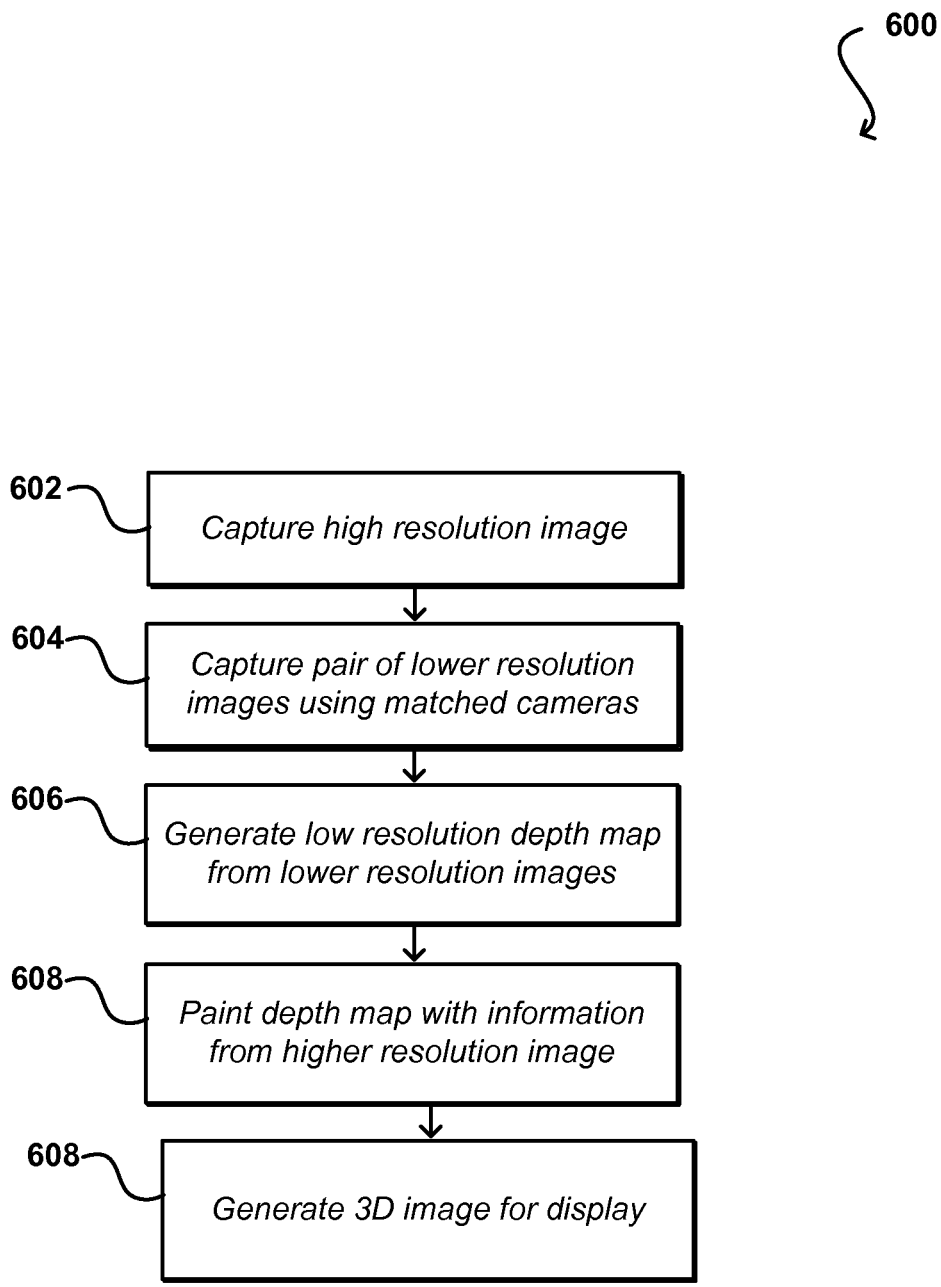
FIG. 6 illustrates a third example process for providing 3D imaging that can be analyzed in accordance with various embodiments.

FIG. 6 illustrates an example process 600 for generating 3D image information using disparate cameras that can be used in accordance with various embodiments. In this example, a high resolution, high color image is captured 602 using a large format camera module. Stereo image information is captured 604 for the same general field of view using two lower resolution, smaller format cameras. A relatively low resolution depth map is generated 606 using the images from the matched low resolution cameras. The color information from the higher resolution image can be used to paint 608 to lower resolution color map. The resulting image can then be displayed 610 as a 3D image.

Figure 7:
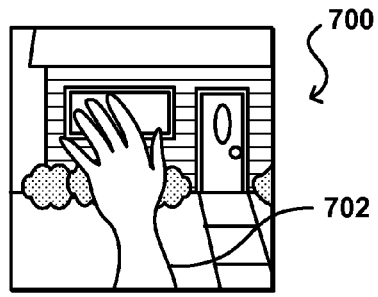
FIGS. 7(a), (b), (c), and (d) illustrate an example images that can be captured and/or generating using a 3D imaging approach in accordance with various embodiments.
Figure 7:
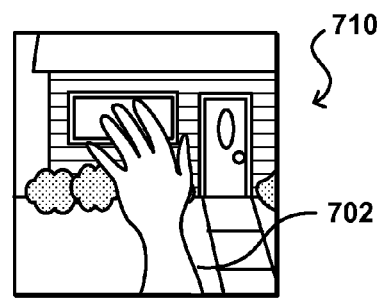
Figure 7:
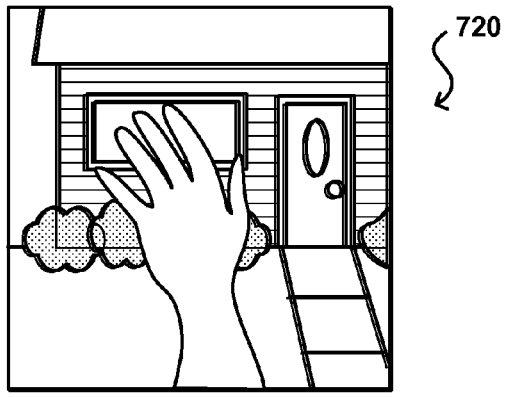
Figure 7:
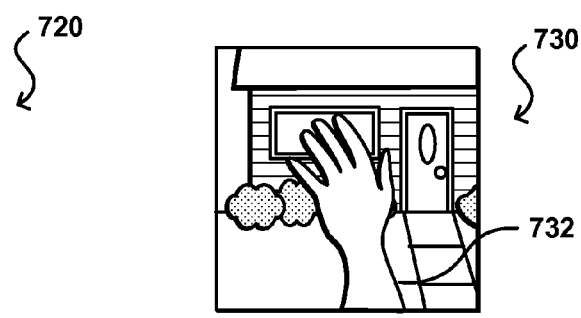

As an example, FIGS. 7(a) and 7(b) illustrate images 700, 710 that could be captured using matched small format cameras in accordance with various embodiments. As illustrated, an object such as the hand 702 appears in different lateral locations in each image, and this displacement information resulting from the different perspectives can be used to generate a disparity map as discussed herein. FIG. 7(c) illustrates an example image 720 of the same general field of view as captured by a larger format camera. As discussed, the color information can be used to paint a lower resolution disparity map, which can result in a lower resolution 3D image, such as the image 730 illustrated in FIG. 7(d).

In some embodiments where two cameras are used that have the same effective pixel size but a different resolution, the pixels from the larger resolution camera can be sub-sampled or binned, as discussed herein to assist in calculation of the disparity map. When the optical system is scaled for the second camera, the camera will have more resolution performance than required (due to the relatively large pixels). By making the lens "faster" (e.g., using a lower f number) the camera can be more sensitive to light, but will also have the depth of field reduced so that it more closely matches the first camera. The increased transmission of the second lens can be accommodated by, for example, optical filtering, reducing the electronic gain on the camera, and/or by digital manipulation of the resultant digital image.

Figure 8:
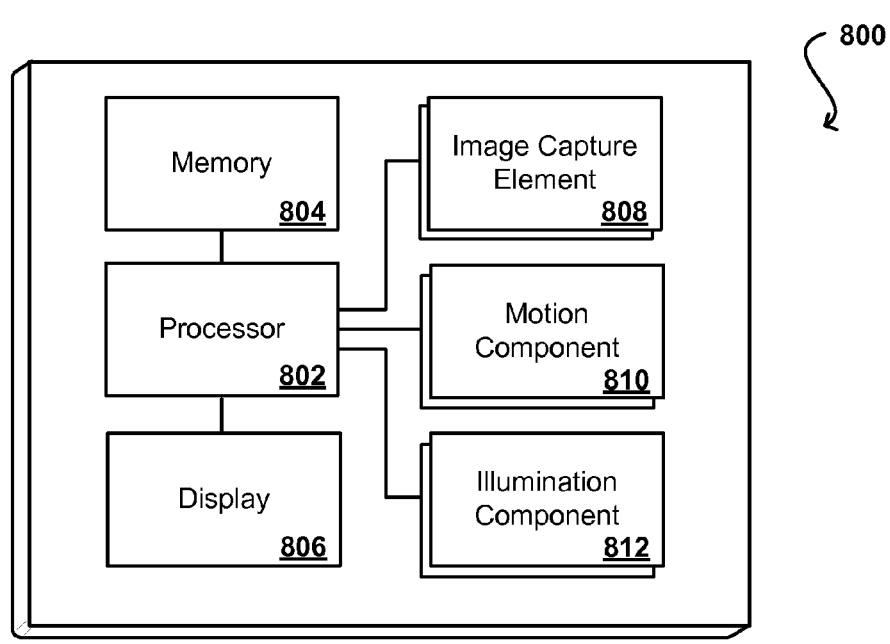
FIG. 8 illustrates an example configuration of components of a computing device such as that illustrated in FIG. 2.

FIG. 8 illustrates an example set of basic components of a computing device 800, such as the device 200 described with respect to FIG. 2. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instructions for execution by the processor 802, the same or separate storage can be used for images or data, a removable storage memory can be available for sharing information with other devices, etc. The device typically will include some type of display element 806, such as a touch screen, electronic ink (e-ink), organic light emitting diode (OLED) or liquid crystal display (LCD), although devices such as portable media players might convey information via other means, such as through audio speakers. In at least some embodiments, the display screen provides for touch or swipe-based input using, for example, capacitive or resistive touch technology.

As discussed, the device in many embodiments will include at least one image capture element 808, such as one or more cameras that are able to image a user, people, or objects in the vicinity of the device. An image capture element can include, or be based at least in part upon any appropriate technology, such as a CCD or CMOS image capture element having a determined resolution, focal range, viewable area, and capture rate. The device can also include at least one dedicated gesture component, such as an IR sensor or detector, operable to capture information for use in determining gestures or motions of the user, which will enable the user to provide input through the portable device without having to actually contact and/or move the portable device. The device can include at least one motion component 810, such as an accelerometer or inertial sensor to measure translation, an electronic compass to calibrate direction in up to three dimensions, an electronic gyroscope to determine and/or track changes in orientation, and other such elements. Motion determining elements can help in determining movement and using the determined movement to correct image information. The device also can include at least one illumination element 812, as may include one or more light sources (e.g., white light LEDs, IR emitters, or flashlamps) for providing illumination and/or one or more light sensors or detectors for detecting ambient light or intensity, etc.

The example device can include at least one additional input device able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual (e.g., gesture) and audio (e.g., spoken) commands such that a user can control the device without having to be in contact with the device.

Figure 9:
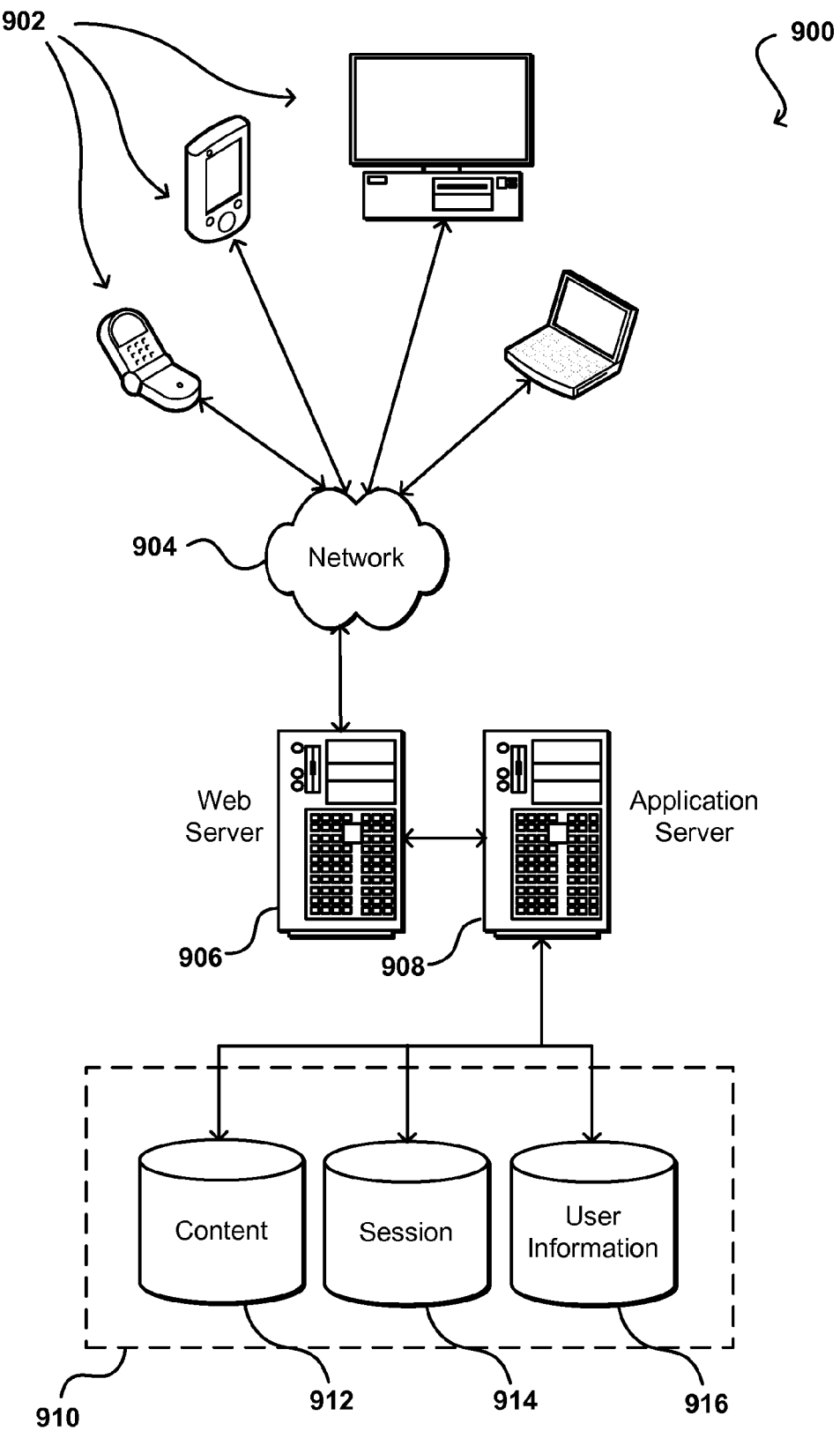
FIG. 9 illustrates an example environment in which various embodiments can be implemented.

As discussed, different approaches can be implemented in various environments in accordance with the described embodiments. For example, FIG. 9 illustrates an example of an environment 900 for implementing aspects in accordance with various embodiments. As will be appreciated, although a Web-based environment is used for purposes of explanation, different environments may be used, as appropriate, to implement various embodiments. The system includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 906 for receiving requests and serving content in response thereto, although for other networks, an alternative device serving a similar purpose could be used, as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 908 can include any appropriate hardware and software for integrating with the data store 910 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 906 in the form of HTML, XML or another appropriate structured language in this example. The handling of all requests and responses, as well as the delivery of content between the client device 902 and the application server 908, can be handled by the Web server 906. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing content (e.g., production data) 912 and user information 916, which can be used to serve content for the production side. The data store is also shown to include a mechanism for storing log or session data 914. It should be understood that there can be many other aspects that may need to be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
capturing, using a first camera of an electronic device, first image data;
capturing, using a second camera of the electronic device, second image data, a first field of view of the first camera at least partially overlapping a second field of view of the second camera;
generating a stereoscopic image by combining a portion of the first image data and a portion of the second image data;
generating a depth map based at least in part on information in the first image data and the second image data;
capturing, using a third camera of the electronic device, third image data, the third camera having a higher resolution than each of the first camera and the second camera;
selecting a portion of image characteristic information from the third image data based at least in part on the depth map;
generating an enhanced stereoscopic image by applying the portion of the image characteristic information to the stereoscopic image, wherein the portion of the image characteristic information overlays a corresponding portion of the stereoscopic image to improve at least an image characteristic; and
displaying the enhanced stereoscopic image.

2. The computer-implemented method of claim 1, further comprising:
determining a primary plane of focus for a plurality of regions of the third image data, wherein selecting a portion of the image characteristic information from the third image data is based at least in part on the determined primary plane of focus for the plurality of regions.

3. The computer-implemented method of claim 1, wherein the image characteristic information comprises at least one of image color information or image intensity information.

4. The computer-implemented method of claim 1, wherein the first image data and the second image data are stored in different locations before being combined to generate the stereoscopic image.

5. The computer-implemented method of claim 1, further comprising:
performing at least one of sub-sampling or binning pixels from the third image data before selecting the portion of the image characteristic information from the third image data.

6. The computer-implemented method of claim 2, further comprising:
displaying the enhanced stereoscopic image on a display of the electronic device.

7. A method of producing a stereoscopic image, comprising:
determining a first depth of focus for a first camera, the first camera having a first field of view;
calculating a second depth of focus for a second camera, wherein the second depth of focus is within a determined variance of the first depth of focus, the second camera having a second field of view at least partially overlapping the first field of view of the first camera;
capturing, using the first camera with the first depth of focus, first image data;
capturing, using the second camera with the second depth of focus, second image data;
generating, using a processor of an electronic device, a stereoscopic image by combining a portion of image information from each of the first image data and second image data;
generating a depth map based at least in part on information in the first image data and the second image data;
capturing, using a third camera, third image data, the third camera having a higher resolution than each of the first camera and the second camera;
selecting a portion of image characteristic information from the third image data based at least in part on the depth map;
generating an enhanced stereoscopic image by applying the portion of the image characteristic information to the stereoscopic image, wherein the portion of the image characteristic information overlays a corresponding portion of the stereoscopic image to improve at least an image characteristic; and
displaying the enhanced stereoscopic image.

8. The method of claim 7, further comprising:
determining an aperture of the second camera based at least in part on the calculated second depth of focus.

9. The method of claim 7, further comprising:
performing at least one of sub-sampling or binning pixels from at least one of the first image data or the second image data before generating the stereoscopic image.

10. The method of claim 7, wherein the first camera has a higher resolution than the second camera.

11. The method of claim 10, further comprising:
determining an amount of sub-sampling operable to reduce a resolution of the second image data to equal a resolution of the first image data; and
determining an effective pitch of pixels of the second camera based at least in part on the determined amount of the sub-sampling.

12. The method of claim 10, wherein
the depth map includes a depth value for each pixel location of at least one object in the second image data.

13. The method of claim 10, wherein the image characteristic data comprises at least one of image color data or image intensity data.

14. The method of claim 10, wherein the information includes at least one of edge matching, color matching, or texture matching of information in the first image data and the second image data.

15. The method of claim 7, wherein the first image data and the second image data are stored in different locations before being combined to generate the stereoscopic image.

16. A non-transitory computer-readable storage medium storing instructions that, when executed by at least one processor of a computing device, cause the computing device to:
capture, using a first camera, first image data;
capture, using a second camera, second image data, a first field of view of the first camera at least partially overlapping a second field of view of the second camera;
generate a stereoscopic image by combining a portion of image information from each of the first image data and the second image data;
generate a depth map based at least in part on information in the first image data and the second image data based at least in part on the depth map;
capture, using a third camera, third image data, the third camera having a higher resolution than the first camera or the second camera, the third image data comprising at least one of color image data or intensity image data;
select a portion of the color image data or the intensity image data from the third image data;

generate an enhanced stereoscopic image by applying the portion of the color image data or the intensity image data to the stereoscopic image, wherein the portion of the image characteristic information overlays a corresponding portion of the stereoscopic image to improve at least an image characteristic; and display the enhanced stereoscopic image.

17. The non-transitory computer-readable storage medium of claim 16, wherein the first image data and the second image data are stored in different locations before being combined to generate the stereoscopic image.

18. The non-transitory computer-readable storage medium of claim 16, wherein the instructions when executed further cause the computing device to:

determine a primary plane of focus for a plurality of regions of the third image data, wherein selecting the portion of the color image data or the intensity image data from the third image data is based at least in part on the determined primary plane of focus for the plurality of regions.

19. The non-transitory computer-readable storage medium of claim 16, wherein the instructions when executed further cause the computing device to:

perform at least one of sub-sampling or binning pixels from the third image data before selecting the portion of the color image data or the intensity image data from the third image data.

20. The non-transitory computer-readable storage medium of claim 16, wherein the instructions when executed further cause the computing device to:

display the enhanced stereoscopic image on a display of the computing device.

* * * * *